United States Patent
Ramachandra et al.

(10) Patent No.: US 10,290,217 B1
(45) Date of Patent: May 14, 2019

(54) SYSTEMS AND METHODS FOR EVALUATION OF RUNWAY CHANGES

(71) Applicant: HONEYWELL INTERNATIONAL INC., Morris Plains, NJ (US)

(72) Inventors: Sripathi Ramachandra, Karnataka (IN); Patricia May Ververs, Ellicott City, MD (US); Thea L. Feyereisen, Hudson, WI (US); Karel Mundel, Vrane nad Vltavou (CZ); Mohammed Ibrahim Mohideen, Karnataka (IN); Mark Pearson, Peoria, AZ (US); Srikanth Desai, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 16/008,233

(22) Filed: Jun. 14, 2018

(51) Int. Cl.
*G08G 5/00* (2006.01)
*G08G 5/02* (2006.01)
*G08G 5/06* (2006.01)
*G06F 3/147* (2006.01)

(52) U.S. Cl.
CPC ......... *G08G 5/0021* (2013.01); *G08G 5/0039* (2013.01); *G08G 5/025* (2013.01); *G08G 5/065* (2013.01); *G06F 3/147* (2013.01); *G08G 5/0013* (2013.01)

(58) Field of Classification Search
CPC .... G08G 5/0021; G08G 5/0039; G08G 5/025; G08G 5/065
USPC ......................................................... 701/120
See application file for complete search history.

(56) References Cited

U.S. PATENT DOCUMENTS

| 6,282,487 B1 | 8/2001 | Shiomi et al. |
| 9,517,844 B2* | 12/2016 | Khatwa ................. B64D 45/00 |
| 2007/0129857 A1 | 6/2007 | Fortier |
| 2008/0071434 A1 | 3/2008 | Fortier et al. |
| 2011/0196598 A1* | 8/2011 | Feyereisen ............. G01C 21/00 701/120 |
| 2016/0063869 A1* | 3/2016 | Kathirvel ............. G08G 5/0043 701/3 |

(Continued)

OTHER PUBLICATIONS

Runway Change on Departure; Apr. 2009; Retrieved from Internet [[http://www.flight.org/runway-change-on-departure]] Jun. 11, 2018.

(Continued)

*Primary Examiner* — Yazan A Soofi
(74) *Attorney, Agent, or Firm* — Lorenz & Kopf, LLP

(57) ABSTRACT

Improved systems and methods for the evaluation of runway changes that analyze the effect of the runway change on relevant factors, and provide intuitive visual feedback of the analysis, are provided. The provided systems and methods depict the original runway and the new runway, side by side, in a pictorial representation. Additionally, a selectable group of relevant factors for each runway is determined. The pictorial representation is overlaid with one or more symbolic indicators that distinctly demark each of the factors, alphanumeric descriptors may also be displayed alongside the symbolic indicators. The provided systems and methods additionally generate a tabular display of the information and factors. The tabular display provides a side by side comparison of the old runway, the new runway, and the relevant factors.

20 Claims, 4 Drawing Sheets

(56) References Cited

U.S. PATENT DOCUMENTS

2018/0061243 A1* 3/2018 Shloosh ............... G08G 5/0013

OTHER PUBLICATIONS

Farrier, T.; Why do airports change runway direction for take-off and landing? Dec. 16, 2015; Retrieved from Internet [[https://www.quora.com/Why-do-airports-change-runway-direction-for-take-off-and-landing]] Jun. 11, 2018.

Falopz; PilotEdge Forums; "last minute runway change while taxing, raining, read it . . . " Professional ATC for Flight Simulators; Apr. 27, 2014; Retrieved from Internet [[http://forums.pilotedge.net/viewtopic.php?t=3963&p=25341]] Jun. 11, 2018.

Screen capture from YouTube video clip entitled "PreDepartureBriefing-FAA briefing example from Was That For Us?" Apr. 8, 2009. Retrieved from Internet [[https://www.youtube.com/watch?v=9HL_SryMBMM]] Jun. 11, 2018.

Schappert, J.; What Makes An Effective Departure Briefing? MZEROA.com; Retrieved from Internet [[https://www.m0a.com/departure-briefing/]] Jun. 11, 2018.

\* cited by examiner

| DATA OF INTEREST | OLD RUNWAY | | NEW RUNWAY |
|---|---|---|---|
| RUNWAY ID | 19R | | 19L |
| WIND | | SAME | |
| RUNWAY LENGTH | 5000 FT | | 5000 FT |
| USABLE RUNWAY LENGTH | 6000 FT | | 4000 FT |
| RUNWAY SURFACE | DRY | | WET |
| NOISE ABATEMENT PROCEDURE | NO | | YES |
| TAXI ROUTE | TAXI VIA ECHO ALPHA DELTA | | RUNWAY 19R, TAXI VIA ALPHA, BRAVO, BRAVO, CROSS RUNWAY 19L, TAXI VIA BRAVO, ALPHA, DELTA |
| DISTANCE FROM CURRENT POSITION | 9000 FT | | 7000 FT |
| PREDICTED TIME TO REACH RUNWAY | 6 MINS | | 14 MINS |
| IS LAHSO APPLICABLE | NO | | NO |
| HOTSPOT IN BETWEEN | NO | | TAXI VIA ALPHA, BRAVO,BRAVO AT 3000 FT FROM CURRENT POSITION |
| TERRAIN | MOUNTAIN PEAK AT 3500 FT UPON AIRBORNE | | NO |
| V-SPEEDS (V1, VR, V2) | 134/140/157 | | 130/136/154 |

FIG. 3

SYSTEMS AND METHODS FOR EVALUATION OF RUNWAY CHANGES

TECHNICAL FIELD

The technical field generally relates to aircraft display systems, and more particularly relates to flight display systems and related operating methods for the evaluation of runway changes.

BACKGROUND

During Departure and Arrival, the pilot is generally tasked with multiple aspects of aircraft control and guidance, and therefore experiencing high cognitive demands. A change request to an assigned runway that is received during a Departure or Arrival procedure requires a timely analysis to determine its effect on relevant factors, and the analysis requires integrating inputs from a variety of sources. The analysis includes, but is not limited to, effects on aircraft performance calculations, effects on initialization and mode settings, potential reconfiguration of flaps, potential reconfiguration of engine thrust systems, and potentially new departure briefings.

Therefore, when the pilot receives a change request to an assigned runway during a Departure or Arrival, the pilot's cognitive demand often increases. As may be appreciated, the increase in pilot workload associated with a runway change request may be proportionate to the magnitude of the runway change. Therefore, improved systems and methods for runway change evaluation are desirable.

Accordingly, improved systems and methods for the evaluation of runway changes that analyze the effect of the runway change on relevant factors, and provide intuitive visual feedback of the analysis, are desired. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an exemplary embodiment, a method for a flight display system for an aircraft is provided. The method includes: at a control module, receiving weather data from a weather data source; receiving, from a flight management system (FMS), navigation data providing a current location of the aircraft; receiving a runway change communication designating a new runway; responsive to receiving the runway change communication, processing the navigation data, the weather data, the original runway and the new runway to determine, for each of the original runway and the new runway, factors, comprising: a runway identification; a taxi route; hot spots on the taxi route; a distance from the current location of the aircraft; a predicted time to reach the runway from the aircraft's current location; a runway surface status; a runway length; and a usable runway length; generating a table of the factors in alphanumeric format; generating display commands for a display system to render the table and a pictorial representation including the factors; and at a display system, responsive to receiving display commands, rendering the table of the factors in alphanumeric format; and rendering a pictorial representation of the aircraft at a current location, and a route associated with an original runway assigned to the aircraft; and (a) visually distinguishing, on the pictorial representation, (i) the taxi route for the original runway using a first format, and (ii) the taxi route for the new runway using a second format; and (b) for each of the assigned runway and the new runway, overlaying, on the pictorial representation, symbolic indicators that distinctly demark each of the factors.

A flight display system for an aircraft is provided. The flight display system includes: an airport features database; a source of external data providing a meteorological terminal aviation routine weather report (METAR); a display system configured to render a pictorial representation of the aircraft at a current location, and a route associated with an original runway assigned to the aircraft; and a control module operationally coupled to the airport features database, the source of external data, and the display system, the control module comprising a processor and a memory, and configured to, receive navigation data providing a current location of the aircraft; receive a runway change communication designating a new runway; responsive to receiving the runway change communication, process the navigation data, the METAR, the original runway and the new runway to determine, for each of the original runway and the new runway, factors, comprising: a runway identification; a taxi route; hot spots on the taxi route; a distance from the current location of the aircraft; a predicted time to reach the runway from the aircraft's current location; a runway surface status; a runway length; and a usable runway length; generate a table of the factors in alphanumeric format; command the display system to render the table; and command the display system to (a) visually distinguish, on the pictorial representation, (i) the taxi route for the original runway using a first format, and (ii) the taxi route for the new runway using a second format; and (b) for each of the assigned runway and the new runway, overlay, on the pictorial representation, symbolic indicators that distinctly demark each of the factors.

Also provided is an aircraft. The aircraft includes: a source of aircraft status data; an airport features database; a source of external data providing a meteorological terminal aviation routine weather report (METAR); a display system configured to render a pictorial representation of the aircraft at a current location, and a route associated with an original runway assigned to the aircraft; and a control module operationally coupled to the source of aircraft status data, the airport features database, the source of external data, and the display system, the control module comprising a processor and a memory, and configured to, receive aircraft status data providing a current location of the aircraft; receive a runway change communication designating a new runway; process the navigation data, the METAR, the original runway and the new runway to determine, for each of the original runway and the new runway, factors, including: a runway identification; a taxi route; hot spots on the taxi route; a distance from the current location of the aircraft; a predicted time to reach the runway from the aircraft's current location; a runway surface status; a runway length; and a usable runway length; generate a table of the factors in alphanumeric format; and generate display commands for the display system to (a) render the table; (b) visually distinguish, on the pictorial representation, (i) the taxi route for the original runway using a first format, and (ii) the taxi route for the new runway using a second format; and (c) for each of the assigned runway and the new runway, overlay, on the pictorial representation, symbolic indicators that distinctly demark each of the factors.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and:

FIG. 3 is a tabular representation of runway comparison information generated by the system for evaluation of runway changes, in accordance with an exemplary embodiment.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Exemplary embodiments of the novel disclosed flight display system for evaluation of runway changes (FIG. 1, 102) provide technologically improved systems and methods for evaluating runway changes that occur during takeoff and during landing. The figures and descriptions below provide more detail.

Figure 1:
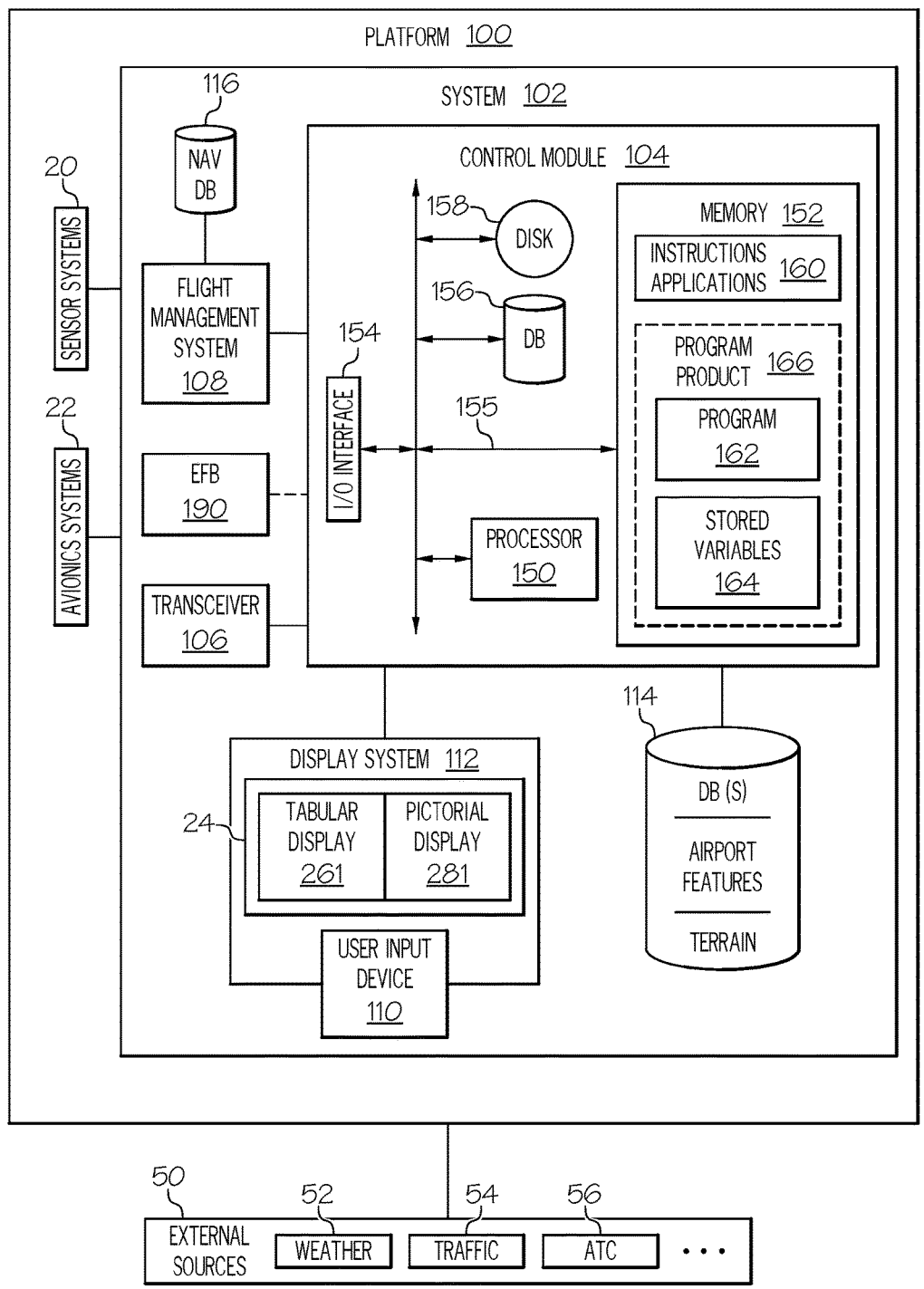
FIG. 1 is a block diagram of a flight display system for evaluation of runway changes, in accordance with an exemplary embodiment.

Turning now to FIG. 1, in an embodiment, the flight display system for evaluation of runway changes 102 (also referred to herein as "system" 102) is generally located in a mobile platform 100. In various embodiments, the mobile platform 100 is an aircraft, and is referred to as aircraft 100. The system 102 embodies a runway change control module 104 (also referred to herein as "control module" 104). In some embodiments, the control module 104 may be integrated within a preexisting mobile platform management system, avionics system, cockpit display system (CDS), flight controls system (FCS), or aircraft flight management system (FMS 108). Although the control module 104 is shown as an independent functional block, onboard the aircraft 100, optionally, it may exist in an optional electronic flight bag (EFB 190). In embodiments in which the control module 104 is within the EFB 190, the display system 112 and user input device 110 may also be part of the EFB 190.

Further, in some embodiments, the control module 104 may reside in a portable electronic device (PED) such as a tablet, cellular phone, or the like.

The control module 104 performs the functions of the system 102. In order to perform these functions, the control module 104 may be operatively coupled to any combination of the following aircraft systems: a transceiver 106, a source of aircraft status data, such as a flight management system (FMS) 108, a user input device 110, display system 112, and one or more databases 114. The functions of these aircraft systems, and their interaction, are described in more detail below.

The FMS 108 is configured to provide real-time navigation data and/or information regarding operation of the aircraft 100, including real-time flight guidance for aircraft 100. As used herein, "real-time" is interchangeable with current and instantaneous. In operation, the FMS 108 may further be integrated with, or receive and process, real-time data and information from a sensor system 20 and a navigation database 116. As used herein, the FMS 108 supports controller pilot data link communications (CPDLC), such as through an aircraft communication addressing and reporting system (ACARS) router; this feature may be referred to as a communications management unit (CMU) or communications management function (CMF).

The sensor system 20 may be realized as including a global positioning system (GPS), inertial reference system (IRS), or a radio-based navigation system (e.g., VHF omnidirectional radio range (VOR) or long-range aid to navigation (LORAN)), and may include one or more navigational radios or other sensors suitably configured to support operation of the FMS 108, as will be appreciated in the art. The navigation database 116 may be a storage location that may maintain a database of flight plans, as well as information regarding terrain and airports and/or other potential landing locations (or destinations) for the aircraft 100. In this regard, the navigation database 116 can maintain an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like).

The avionics system(s) 22 provide aircraft performance data and feedback for subsystems on the aircraft 100. Examples of the performance data include: engine thrust level, fuel level, braking status, temperature control system status, and the like. As may be appreciated, the avionics system(s) 22 may therefore include a variety of on-board detection sensors, and may be operationally coupled to the FMS 108.

Accordingly, the FMS 108 is a source for real-time aircraft status data of the aircraft 100, the aircraft status data (also referred to herein as navigation data) including any of: (i) the instantaneous position and location, vertical speed, and ground speed of the aircraft 100 (e.g., the latitude, longitude, orientation, and flight path angle), (ii) the instantaneous altitude (or height above ground level) for the aircraft 100, (iii) the instantaneous heading of the aircraft 100 (i.e., the direction the aircraft is traveling in relative to some reference), and (iv) the current phase of flight. Additionally, the FMS 108 is configured to compare the instantaneous position and heading of the aircraft 100 with an intended flight plan for the aircraft 100. The real-time aircraft status data, referred to as host aircraft status data, is made available such that the display system 112, the transceiver 106, and the control module 104, may further process and/or handle the aircraft status data.

The display system 112 includes a display device 24. The display system 112 is configured to continuously receive real-time flight status and flight plan information from the FMS 108. The control module 104 and the display system 112 are cooperatively configured to generate the commands ("display commands") for the display device 24 to render thereon the various graphical user interface elements, tables, menus, buttons, and pictorial images, as described herein. Specifically, as described below, the display device 24 may render one or both of: a tabular display 26 and a pictorial display 28. In exemplary embodiments, the display device 24 is realized on one or more electronic display devices configured as a combination of an alphanumeric display, a vertical situation display (VSD) and a lateral navigation display (ND). During operation, the VSD continuously renders and updates a graphical representation of the aircraft 100 at its current location, additionally rendering the airspace, air traffic, navigational reference points, and a vertical flight plan associated with a flight plan of the aircraft 100. During operation, the ND continuously renders and updates a top-down graphical representation of the aircraft 100 at its current location (also referred to herein as a pictorial representation) and a route associated with a lateral flight plan of the aircraft 100; additionally, the ND may continuously overlay the graphical representation with one or more information layers of the terrain, meteorological conditions, airspace, air traffic, and navigational reference points. When the aircraft 100 is in the air, the displayed route may be part of a landing procedure, and when the aircraft 100 is on the ground, the displayed route may be a taxi route. Each of the VSD and ND are responsive to display commands from the control module 104 and/or display system 112. As mentioned above, in some embodiments, the display system 112 may be an integral part of the EFB 190.

Renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 is said to display various images and selectable options described herein. In practice, this may mean that the control module 104 generates display commands, and, responsive to receiving the display commands from the control module 104, the display system 112 displays, renders, or otherwise visually conveys on the display device 24, the graphical images associated with operation of the aircraft 100, and specifically, the tabular and pictorial images as described herein.

The user input device 110 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 110 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 110 is configured as a touchpad or touchscreen, it may be integrated with the display system 112. As used herein, the user input device 110 may be used to for a pilot to accept a runway change or to request a runway change.

In various embodiments, any combination of the FMS 108, user input device 110, and transceiver 106, may be coupled to the display system 112 such that the display system 112 may additionally generate or render, on a display device, real-time information associated with respective aircraft 100 components. Coupled in this manner, the FMS 108 and transceiver 106 are configured to support navigation, flight planning, and other aircraft control functions in a conventional manner, as well as to provide real-time data and/or information regarding the operational status of the aircraft 100 to the control module 104. Additionally, in some embodiments, the user input device 110, FMS 108, and display system 112 are configured as a control display unit (CDU).

External sources 50 communicate with the aircraft 100, generally by way of transceiver 106. External sources include: weather and surface data sources 52, such as a source for meteorological terminal aviation weather reports (METARS), automatic terminal information service (ATIS), datalink ATIS (D-ATIS), automatic surface observing system (ASOS); traffic data system(s) 54; air traffic control (ATC) 56; and a variety of other radio inputs. The weather data is understood to be weather data at or relevant to, the runways under analysis. The traffic data system(s) 120 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification.

The transceiver 106 is configured to support instantaneous (i.e., real time or current) communications between the aircraft 100 and the one or more external data source(s) 50. As a functional block, the transceiver 106 represents one or more transmitters, receivers, and the supporting communications hardware and software required for the system 102 to communicate with the various external data source(s) 50 as described herein. In an example, the transceiver 106 supports bidirectional pilot-to-ATC (air traffic control) communications via a datalink. In addition to supporting the data link system, the transceiver 106 is configured to include or support an automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 50. In this regard, the transceiver 106 may allow the aircraft 100 to receive information that would otherwise be unavailable to the pilot and/or co-pilot using only the onboard systems.

In various embodiments, the control module 104 is additionally operationally coupled to one or more databases 114. The databases 114 may include an airport features database, having therein maps and geometries, as well as airport status data for the runways and/or taxi paths at the airport; the airport status data indicating operational status and directional information for the taxi paths (or portions thereof). Airport status data also includes hot-spot information, which means known high-congestion areas and details related thereto. Additionally, the databases 114 may include a terrain database, having therein topographical information for the airport and surrounding environment.

The control module 104 and the display system 112 are cooperatively configured to cause the display device 24 to render information about a current runway in use, and, responsive to a runway change, render tabular and pictorial images, as described in more detail below. A technical effect provided by the control module 104 is the presentation of relevant information about the host aircraft, the original runway route, and the new runway route in an intuitive and quickly comprehensible side by side format. This may decrease cognitive load and increase the speed of decision making in this crucial scenario.

As mentioned, the control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 includes a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 110. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, cause the control module 104 to perform the functions, techniques, and processing tasks associated with the operation of the system 102. Novel program 162 and associated stored variables 164 may be stored in a functional form on computer readable media, as depicted, in memory 152. While the depicted exemplary embodiment is described in the context of a fully functioning computer system 102, those skilled in the art will recognize that the mechanisms of the present disclosure are capable of being distributed as a program product 166, with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150 and the memory 152 form a novel runway change processing engine that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the transceiver 106. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156. In one embodiment, the I/O interface 154 is integrated with the transceiver 106, and obtains data from external data source(s) directly.

The database 156 may include an aircraft-specific parameters database (comprising aircraft-specific parameters for aircraft 100, as well as for a variety of other aircrafts) and parameters and instructions for processing user inputs and rendering images on the display device 24, as described herein. In some embodiments, the database 156 is part of the memory 152. In various embodiments, the database 156 and the database 114 are integrated, either within the control module 104 or external to it. Accordingly, in some embodiments, the airport features and terrain features are pre-loaded and internal to the control module 104. Another form of storage media that may be included in, and utilized by, the control module 104 is an optional hard disk 158.

The images displayed on the display device 24 are understood to be based on current host aircraft status data for the aircraft 100 and to be dynamically updated based on continuously obtaining the current aircraft status data. As used herein, the display device 24 depicts the same portion of a flight path on each of the VSD and ND. External data may be received from weather data sources 52 and traffic data sources 54; accordingly, the images on display device 24 may also be continuously updated to reflect weather and neighbor traffic/relevant traffic within the bounds of the pictorial representation.

Figure 2:
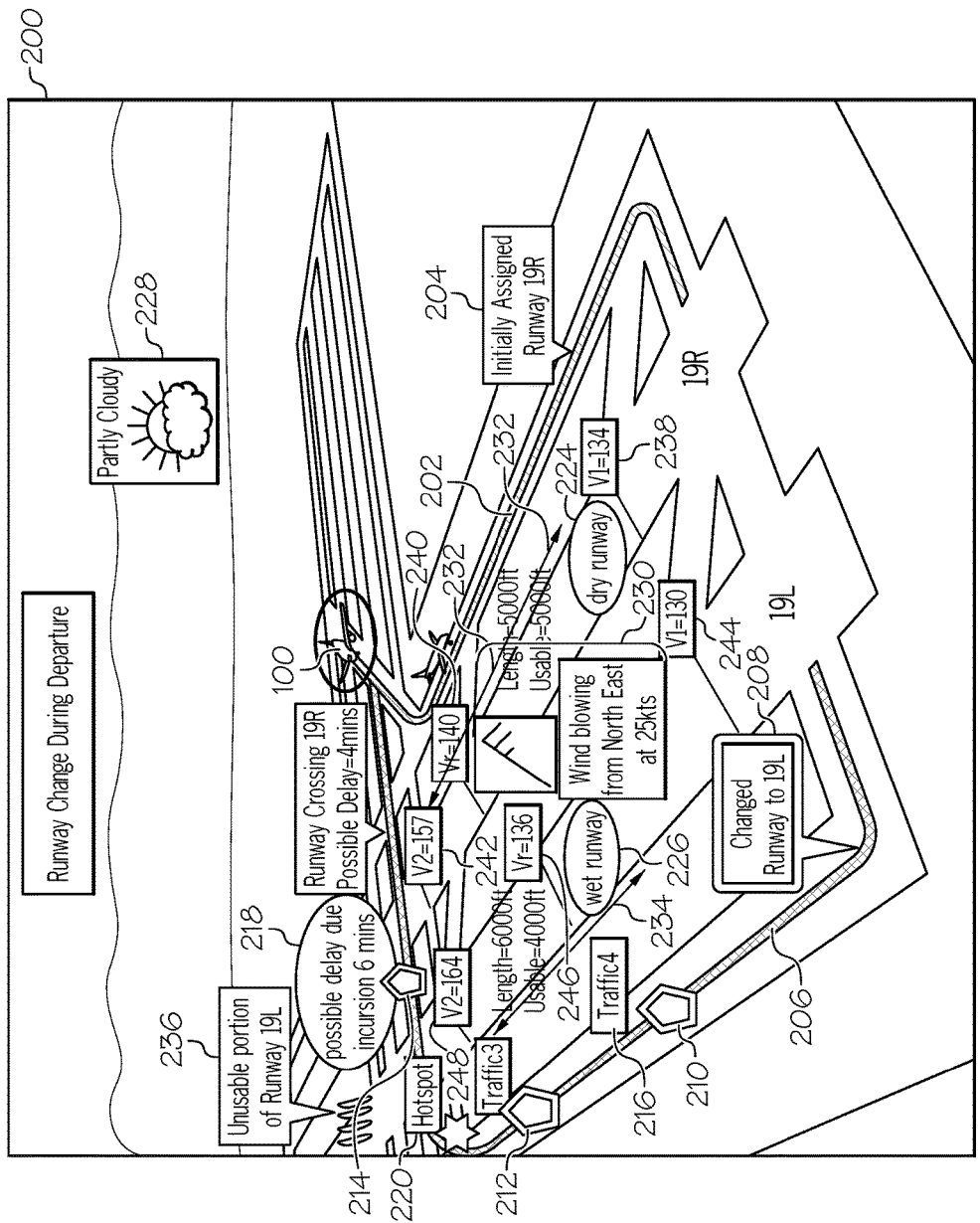
FIG. 2 is an illustration showing a pictorial representation of runway comparison information generated by the system for evaluation of runway changes, in accordance with an exemplary embodiment.

As mentioned, a technical advantage provided by the control module 104 is an intuitive visual presentation of factors for a pilot to consider in the course of evaluating a runway change. The presentation is described as intuitive because it clearly shows events and factors at their respective locations of relevance, and provides side by side comparisons of the original runway and the new runway. The pictorial representation 200 shown in FIG. 2, depicting a Departure operation, illustrates this enhancement. The pictorial representation 200 shows a three-dimensional view of a portion of the airport that incorporates environmental status such as terrain and traffic, weather status, runway conditions, airport hotspot data, and aircraft 100 performance data. A runway 19R and a runway 19L are depicted. Aircraft 100 uses a taxi route along airport taxiways to get from its starting location to the destination runway. In the example depicted, the originally assigned runway is 19R and the new runway is 19L. For the purposes of the examples herein, references to a destination runway include the runway plus the taxi route that the aircraft 100 may take to get to the runway. Accordingly, as indicated on FIG. 2, the originally assigned runway, referred to as original runway 202, is rendered in a first format and labeled with text at 204; and, the new runway 206 is rendered in a second format and labeled with text 208. In an example, a first format, such as a first color, is used for the original runway, and a second format, such as a second color that is different from the first color, is used for the new runway.

As will be described in more detail below, in addition to depicting the original runway, and the new runway, the control module 104 determines a selectable group of relevant factors is for each runway and presents them visually. The pictorial image is overlaid with one or more symbolic indicators that distinctly demark each of the factors, alphanumeric descriptors may also be displayed alongside the symbolic indicators.

With continued reference to FIG. 2, symbols representing neighbor traffic/relevant traffic within the pictorial representation are displayed showing their location and orientation (traffic 210, 212, and 214). The symbols for traffic 210, 212, and 214 may also have text labels alongside them (for example, label 216), which provide additional relevant information. In pictorial representation 200, the neighbor traffic/relevant traffic is not only along the new runway 206, but may cross over it when aircraft 100 is predicted to be at that point. For example, the label 218, associated with traffic 214, provides the relevant information that, at that location, and with respect to that traffic 214, there may be a delay of six minutes due to a possible incursion onto the new runway 206 by traffic 214.

A hotspot 220, located at a turn in the new runway 206, is indicated by one or more of a symbol and text. The label "dry runway" 224 is placed on runway 19R responsive to determining that runway 19R conditions are dry. The label "wet runway" 226 is placed on runway 19L responsive to determining that runway 19L conditions are wet. Overall airport weather is depicted with a symbol and text to indicate partly cloudy 228, while weather at the location of the runways is depicted with a symbol and text to indicate wind blowing from the north east at 26 knots (230). Length of each runway is depicted in text, along with the amount of that length that is usable runway, as is seen with length indicator 232 indicating a length of 5000 feet and usable length of 5000 feet for runway 19R; and length indicator 234 indicating a length of 6000 feet and usable length of 4000 feet for runway 19L. At 236, the unusable portion of runway 19L is visually distinguished and textually labeled.

Federal Aviation regulations for takeoff speeds, referred to as "V-Speeds," are calculated for the aircraft 100 on the original runway and on the new runway. The V-speeds vary depending on aircraft specific parameters, such as type of engine and number of engines. In the pictorial representation, the control module 104 displays the V-speeds on the runways at their relevant locations. For example, on runway 19R, V1 speed is 134 (238), Vr speed is 140 (240), and V2 speed is 157 (242). On runway 19L, V1 speed is 130 (244), Vr speed is 136 (246), and V2 speed is 164 (248).

As mentioned, the control module 104 may also present the determined data and information on the display device 24 in the form of a tabular display 26. FIG. 3 is an illustration of a tabular representation of runway comparison information generated by the system 102, in accordance with an exemplary embodiment. In the exemplary embodiment, table 300 includes columns titled "Data of Interest" (column 302), "Old Runway" (column 304), and "New Runway" (column 306). Column 304 and column 306 are rendered in two distinctly different background shades or colors to enhance visual distinguishability and fast comprehension. It may be appreciated that the tabular information presented may be displayed in different orders, and as selected and predetermined in different embodiments.

Stepping through the information presented in table 300, the example is as follows. In the first row (308) the old runway is shown as 19R, and the new runway is shown as 19L. At row 310, wind is denoted, and in the example, there is no wind difference detected between the old runway and the new runway. At row 312, old runway has runway length 5000 ft. and new runway has runway length 5000 ft. However, at row 314, it is depicted that of the runway lengths, old runway has 6000 usable feet, while new runway has 4000 usable feet. Old runway further is dry with no noise abatement procedures whereas new runway is wet but does have noise abatement features (rows 316 and 318). Noise abatement features may include walls and acoustic treatments to features along the route.

Travel paths or routes from the host aircraft 100 current position to target runway are described in additional detail in the table. For example, the distance to the old runway is 9000 feet (ft.) whereas the distance to the new runway is 7000 ft. (row 322). The taxi route to the old runway is "taxi via Echo Alpha Delta," however, the taxi route to the new runway is "taxi via Alpha, Bravo, Cross runway 91L, taxi via Bravo, Alpha, Delta," (row 320). There are no hot spots on the taxi route to the old runway, but the taxi route to the new runway involves passing through a hot spot at Alpha, Bravo, Bravo at 3000 ft. from the current position (row 328); accordingly, a predicted time to arrive is affected; it is six minutes to the old runway, and 14 minutes to the new runway (row 324). Row 326 indicates that there are no land and hold short operations (LAHSO) associated with either runway. Row 330 indicates that there is a mountain peak at 3,500 ft. upon becoming airborne, when taking the old runway, but no terrain issue with respect to the new runway. And, row 332 the performance calculations for the V-speeds (V1, Vr, V2) for each runway are displayed.

It is to be understood that the control module 104 also capably determines the relevant factors during an approach operation. The rendered pictorial image for an approach operation reflects the view from the host aircraft 100 approaching the airport, with the original runway and new runway visually distinguished as described herein. All relevant and selected factors are generated and presented in the tabular display 26 and/or the pictorial display 28.

Figure 4:
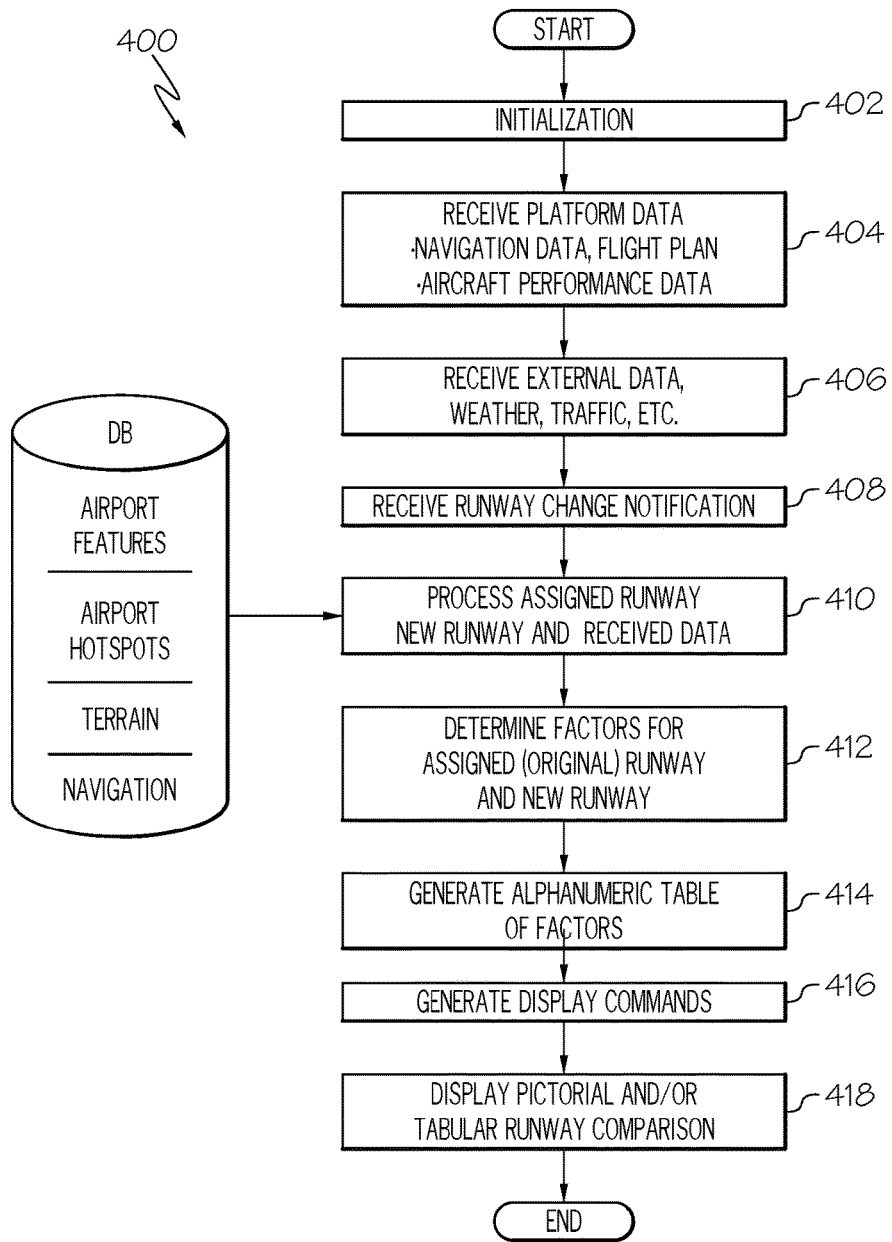
FIG. 4 is a flow chart for a method for evaluation of runway changes, in accordance with an exemplary embodiment.

Referring now to FIG. 4 and with continued reference to FIGS. 1-3, a flow chart is provided for a method 400 for providing a system 102, in accordance with various exemplary embodiments. Method 400 represents various embodiments of a method for evaluation of LOS. For illustrative purposes, the following description of method 400 may refer to elements mentioned above in connection with FIG. 1. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method starts, and at 402 the control module 104 is initialized. As mentioned above, initialization may comprise uploading or updating instructions and applications 160, program 162, stored variables 164, and the various lookup tables stored in the database 156. Predetermined variables may include, for example, predetermined distances and times to use as thresholds, parameters for setting up a user interface, and the various shapes, various colors and/or visually distinguishing techniques used for tables, icons, and alerts. In some embodiments, program 162 includes additional instructions and rules for rendering information differently based on type of display device in display system 112. Initialization at 402 may also include identifying external sources 50 and/or external signals and the communication protocols to use with each of them.

At 404, real-time platform data is continuously received and processed. The platform data includes navigation data (aircraft status data), flight plan data, and aircraft performance data. At 404, the aircraft 100 is in operation, and has an assigned flight plan. The flight plan provides, identified therein, an assigned runway (also referred to as the original runway). At 406, external data is received from external source(s) 50. External data may include, but not be limited to, one or all of: weather data received from a source of weather data 52; traffic data received from a source of traffic information 54; and, air traffic control (ATC) data. In an embodiment, the weather data is a meteorological terminal aviation routine weather report (METAR).

At 408, a runway change notification is received, which provides a new runway. At 410, responsive to receiving the runway change notification, the runway change is processed with the received data. Additionally, at 410, the control module 104 may reference and process relevant stored data with the received data, the original runway and the new runway. The relevant stored data may include, (i) airport features, such as locations, dimensions, and orientations of taxiways and runways, as well as their current condition; (ii) known hotspots for the airport, such as bottleneck areas and areas of high congestion; (iii) terrain, such as nearby mountain peaks; and, (iv) navigation data, such as departure procedures and arrival procedures. The relevant stored data may be referenced or received from one or more of DB(s) 114, memory 152, and database 156. The processing at 410 may include ensuring that the new runway matches the departure procedure. In the case of a runway change during an approach, the processing at 410 may include ensuring that the new runway matches the approach procedure.

The processing at 410 supports the mapping of the original runway and the new runway, and specifically enables the determination of the relevant factors as described herein. The factors are a series of selectable factors, and, for each respective runway, each may be calculated or determined at 412. Non-limiting examples of selectable factors that may be determined at 412 include, a runway identification;
a flight path or taxi route from the aircraft 100 current location to the runway;
hot spots on the taxi route;
a distance to the runway from the current location of the aircraft;
a predicted time to reach the runway from the aircraft's current location;
a runway surface status;
a runway length;
a usable runway length;
terrain along the flight path or taxi route;
current wind measurements at the runway;
an associated land and hold short operation (LAHSO), if applicable; and
relevant federal aviation regulation v-speeds (v-speeds).

The above factors are selectable, in that, some or all of them may be selectively predetermined to be displayed by default. Further, some or all of the factors may be selected or deselected from the tabular display and from the pictorial display, by a user after viewing the displayed information. A user may edit the list of factors to be determined via the user input device 110.

At 414, the table of selected alphanumeric factors is generated, and at 416 display commands are generated. At 418, the control model may command the display system 112 to render thereon the table, in a tabular display 26, the pictorial representation in a pictorial display 28, or both. As mentioned above, various symbolic indicators may be employed to distinctly demark each of the factors when the pictorial display 28 is utilized.

As is readily appreciated, the above examples of the system for evaluation of runway changes 102 are non-limiting, and many others may be addressed by the control module 104. Thus, technologically improved systems and methods that provide intuitive visual advance notice of a variety of relevant factors associated with a potential runway change are provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight display system for an aircraft, comprising:
   an airport features database;
   a source of external data providing a meteorological terminal aviation routine weather report (METAR);
   a display system configured to render a pictorial representation of the aircraft at a current location, and a route associated with an original runway assigned to the aircraft;
   and
   a control module operationally coupled to the airport features database, the source of external data, and the display system, the control module comprising a processor in communication with a memory having stored therein a program containing computer instructions, which, when executed by the processor, cause the control module to,
      receive navigation data providing a current location of the aircraft;
      receive a runway change communication designating a new runway;
      responsive to receiving the runway change communication,
         process the navigation data, the METAR, the original runway and the new runway to determine, for each of the original runway and the new runway, factors, comprising:
            a runway identification;
            a taxi route;
            hot spots on the taxi route;
            a distance from the current location of the aircraft;
            a predicted time to reach the runway from the aircraft's current location;
            a runway surface status;
            a runway length; and
            a usable runway length;
         generate a table of the factors in alphanumeric format;
         command the display system to render the table; and
         command the display system to (a) visually distinguish, on the pictorial representation, (i) the taxi route for the original runway using a first format, and (ii) the taxi route for the new runway using a second format; and (b) for each of the assigned runway and the new runway, overlay, on the pictorial representation, symbolic indicators that distinctly demark each of the factors.

2. The flight display system of claim 1, wherein the program containing computer instructions, when executed by the processor, further cause the control module to receive aircraft performance data, and wherein determining, for each of the original runway and the new runway, factors, is further based on processing the aircraft performance data.

3. The flight display system of claim 2, wherein determined factors additionally include, for each runway, current wind measurements thereat.

4. The flight display system of claim 3, wherein determined factors additionally include, for each runway, an associated land and hold short operation (LAHSO).

5. The flight display system of claim 3, wherein determined factors additionally include, for each runway, relevant federal aviation regulation v-speeds (v-speeds).

6. The flight display system of claim 4, wherein the source of external data further provides traffic information, and wherein the control module is further configured to display a symbol representing a relevant traffic at its location on the pictorial representation.

7. The flight display system of claim 6, wherein the runway change communication is received from air traffic control.

8. The flight display system of claim 6, wherein the runway change communication is requested by a pilot.

9. The flight display system of claim 6, wherein the navigation data further comprises a departure procedure, and the control module is further configured to ensure that the new runway matches the departure procedure.

10. A method for a flight display system for an aircraft, comprising:
at a control module, comprising a processor in communication with a memory having stored therein a program containing computer instructions, which, when executed by the processor, cause the control module to perform the operations of,
receiving weather data from a weather data source;
receiving, from a flight management system (FMS), navigation data providing a current location of the aircraft;
receiving a runway change communication designating a new runway;
responsive to receiving the runway change communication,
processing the navigation data, the weather data, the original runway and the new runway to determine, for each of the original runway and the new runway, factors, comprising:
a runway identification;
a taxi route;
hot spots on the taxi route;
a distance from the current location of the aircraft;
a predicted time to reach the runway from the aircraft's current location;
a runway surface status;
a runway length; and
a usable runway length;
generating a table of the factors in alphanumeric format;
generating display commands for a display system to render the table and a pictorial representation including the factors; and
at a display system, responsive to receiving display commands,
rendering the table of the factors in alphanumeric format; and
rendering a pictorial representation of the aircraft at a current location, and a route associated with an original runway assigned to the aircraft; and
(a) visually distinguishing, on the pictorial representation, (i) the taxi route for the original runway using a first format, and (ii) the taxi route for the new runway using a second format; and (b) for each of the assigned runway and the new runway, overlaying, on the pictorial representation, symbolic indicators that distinctly demark each of the factors.

11. The method of claim 10, further comprising:
at the control module, executing the program containing computer instructions, to further cause the cause the control module to perform the operations of, receiving aircraft performance data; and
wherein determining, for each of the original runway and the new runway, factors, is further based on processing the aircraft performance data.

12. The method of claim 11, further comprising, determining, for each runway, current wind measurements, an associated land and hold short operation (LAHSO), and relevant federal aviation regulation v-speeds (v-speeds).

13. The method of claim 12, further comprising:
receiving, from the source of external data, traffic information; and
displaying a symbol representing a relevant traffic at its location on the pictorial representation.

14. The method of claim 13, wherein the navigation data further comprises a departure procedure, and further comprising ensuring that the new runway matches the departure procedure.

15. The method of claim 14, wherein the weather data is a meteorological terminal aviation routine weather report (METAR).

16. An aircraft, comprising:
a source of aircraft status data;
an airport features database;
a source of external data providing a meteorological terminal aviation routine weather report (METAR);
a display system configured to render a pictorial representation of the aircraft at a current location, and a route associated with an original runway assigned to the aircraft;
and
a control module operationally coupled to the source of aircraft status data, the airport features database, the source of external data, and the display system, the control module comprising a processor in communication with a memory having stored therein a program containing computer instructions, which, when executed by the processor, cause the control module to,
receive aircraft status data providing a current location of the aircraft;
receive a runway change communication designating a new runway;
process the navigation data, the METAR, the original runway and the new runway to determine, for each of the original runway and the new runway, factors, comprising:
a runway identification;
a taxi route;
hot spots on the taxi route;

a distance from the current location of the aircraft;
a predicted time to reach the runway from the aircraft's current location;
a runway surface status;
a runway length; and
a usable runway length;

generate a table of the factors in alphanumeric format; and generate display commands for the display system to
(a) render the table;
(b) visually distinguish, on the pictorial representation, (i) the taxi route for the original runway using a first format, and (ii) the taxi route for the new runway using a second format; and
(c) for each of the assigned runway and the new runway, overlay, on the pictorial representation, symbolic indicators that distinctly demark each of the factors.

17. The aircraft of claim 16, wherein the processor, upon further executing the program containing computer instructions, further cause the control module to receive aircraft performance data, and wherein determining, for each of the original runway and the new runway, factors, is further based on processing the aircraft performance data.

18. The aircraft of claim 17, wherein the source of external data further provides traffic information, and wherein the control module is further configured to display a symbol representing a relevant traffic at its location on the pictorial representation.

19. The aircraft of claim 18, wherein the navigation data further comprises a departure procedure, and the control module is further configured to ensure that the new runway matches the departure procedure.

20. The aircraft of claim 18, wherein the navigation data further comprises an approach procedure, and the control module is further configured to ensure that the new runway matches the approach procedure.

* * * * *